Figure 1:
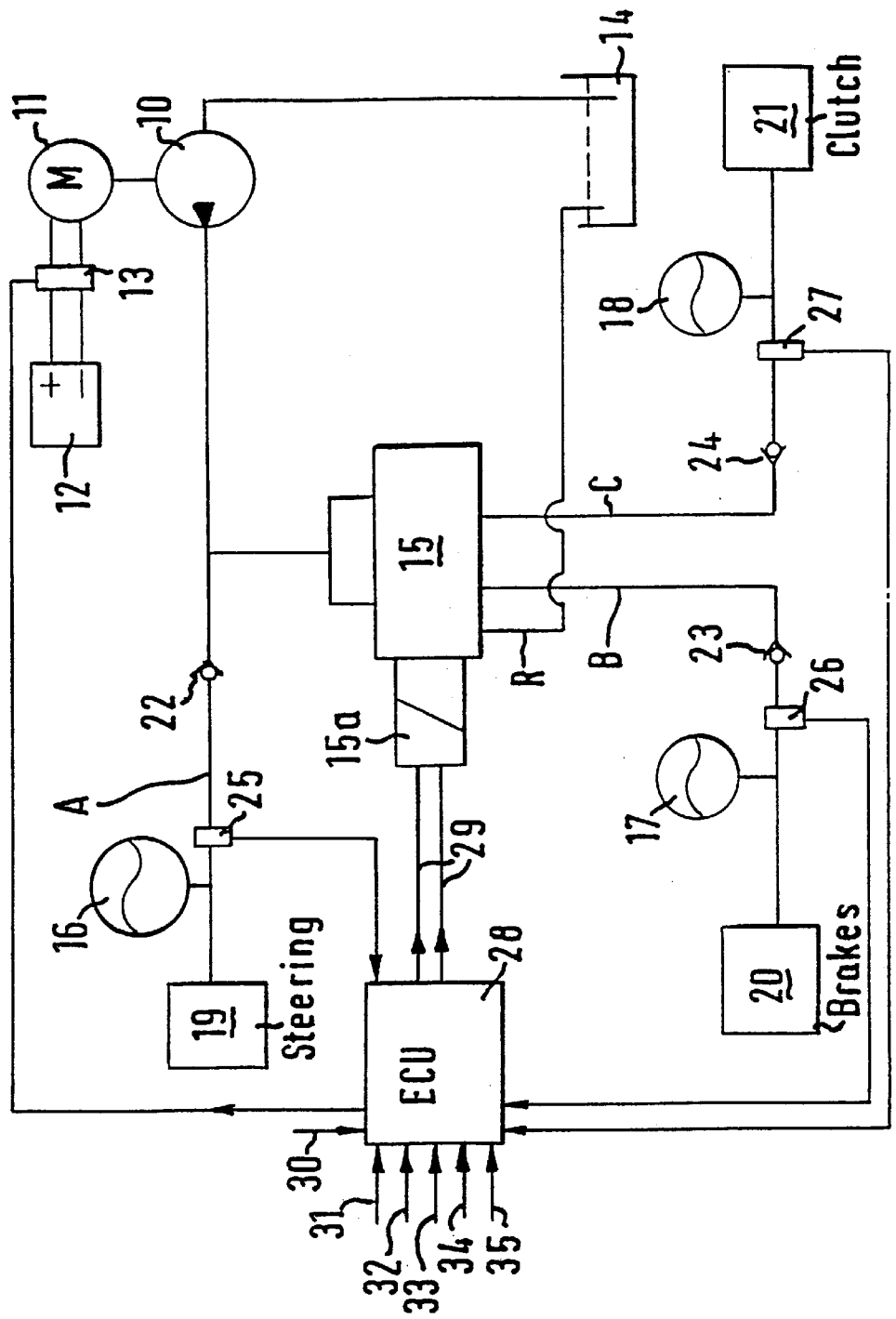

United States Patent [19]
Harries

[11] Patent Number: 5,836,347
[45] Date of Patent: Nov. 17, 1998

[54] FLUID PRESSURE SUPPLY SYSTEM

[75] Inventor: David Anthony Harries, Welford on Avon, Great Britain

[73] Assignee: Kongsberg Techmatic UK Limited, Leamington Spa, England

[21] Appl. No.: 634,155

[22] Filed: Mar. 27, 1996

[51] Int. Cl.$^6$ ............................................... F16K 31/12
[52] U.S. Cl. ...................... 137/487.5; 60/413; 60/422; 91/526; 137/488; 137/118.07; 137/115.25; 137/119.09; 137/119.1
[58] Field of Search ............................. 137/487.5, 488, 137/119.09, 119.1, 118.01, 118.06, 118.07, 115.25; 60/413, 422; 91/526, 532, 536

[56] References Cited

U.S. PATENT DOCUMENTS

| | | | |
|---|---|---|---|
| 3,579,987 | 5/1971 | Busse | 60/52 |
| 3,785,393 | 1/1974 | Tanguy | 137/110 |
| 3,963,039 | 6/1976 | Coeurderoy | 137/118.06 |
| 4,741,247 | 5/1988 | Glomeau et al. | 60/413 |
| 4,759,183 | 7/1988 | Kreth et al. | 60/422 |
| 5,289,679 | 3/1994 | Yasuda | 60/442 |
| 5,727,389 | 3/1998 | Harries | 60/413 |

*Primary Examiner*—Denise L. Ferensic
*Assistant Examiner*—Joanne Y. Kim
*Attorney, Agent, or Firm*—Paul E. Milliken; Lee A. Germain

[57] ABSTRACT

A vehicle fluid pressure supply system in which a fluid pressure supply pump (10) is connected via solenoid-operated flow control valve (15) with a plurality of separate fluid pressure operated circuits(A, B, C) each operating separate functions of the vehicle. Detectors (25, 26, 27, 30 to 35) are provided for detecting the current operative state and the fluid pressure supply status of each circuit, and an electrical control unit (28) means which receives signals from the detectors operates the control valve to direct available pump flow to the appropriate circuit to maintain each circuit at least at a minimum pressure level required to operate the associated function.

10 Claims, 3 Drawing Sheets

FLUID PRESSURE SUPPLY SYSTEM

This invention relates to fluid pressure supply sytems and in particular to such systems for supplying fluid pressure to operate various function of a vehicle such as steering, braking, active suspension and clutch actuation.

It is an object of the present invention to provide an improved form of fluid pressure supply system for a vehicle which avoids the necessity for complex priority flow control valves and variable delivery pumps.

Thus according to the present invention there is provided a vehicle fluid pressure supply system comprising a fluid pressure supply pump connected via solenoid—operated flow control valve means with a plurality of separate fluid pressure operated circuits each operating separate function of the vehicle, means for detaching the current operative state and the fluid pressure supply status of each circuit, and electrical control means which receives signals from the detecting means and operates the control valve means to direct available pump flow to the appropriate circuit to maintain each circuit at least at a minimum pressure level required to operate the associated function.

If the circuits control functions such as cluth take-up, disengagement and re-engagement (as, for example, in the semi-automatic type of transmission described in the Applicant's earlier European patents nos 0038113, 0043660, 0059035 and 0101220 and European Application No. 0566595) then the electrical control means may require to receive other inputs indicative of vehicle operating parameters such as engine speed, road speed, transmission gear selected and clutch engagement position.

The supply system is preferably arranged to maintain the fluid pressure level in each circuit between said minimum pressure level and a predetermined maximum pressure level indicative of a fully charged condition.

In a preferred arrangement the pump is drive by an electric motor and is switched off to save current and power when the circuits are fully charged.

One embodiment of the present invention will now be described, by way of example only, with reference to the accompanying drawings in which:

FIG. 1 is a schematic diagram of a vehicle fluid pressure supply system in accordance with the present invention, and FIGS. 2–5 are schematic diagrams showing valve spool positions for the various circuits supply conditions of the system shown in FIG. 1.

Referring to FIG. 1, a vehicle fluid pressure supply system comprises a fluid pump 10 driven by an electric motor 11 from a vehicle battery 12. Operation of the motor 11 is controlled by a relay 13 in the connection between the motor 11 and battery 12.

Pump 10 draws hydraulic fluid from a reservoir 14 and delivers this fluid to a number of hydraulic circuits via a solenoid operated fluid flow control valve 15. In the example described three hydraulic circuits A, B and C receive fluid from pump 10 via valve 15 and a return line R is also provided which returns unwanted fluid to reservoir 14.

Each fluid circuit A, B and C includes an accumulator 16, 17 and 18 respectively and an hydraulic load which in the case of circuit A is a power steering motor (indicated by box 19), in the case of circuit B is a braking system (indicated by box 20), and in the case of circuit C is a clutch controlled system (indicated by box 21). Each hydraulic circuit is connected with the pump via a non-return valve 22, 23 and 24 respectively and also includes a fluid pressure sensor 25, 26 and 27 respectively.

The distribution of fluid from pump 10 to circuits A, B and C via valve 15 is controlled by an electrical microporcessor control means 28 which operates valve 15 via solenoid 15a and associated lines 29. Relay 13 and pressure sensors 25, 26 and 27 are connected with control means 28. Depending on the functions which circuits A, B and C are to control on the vehicle the control means 28 also receives additional vehicle operating input signals represented in FIG. 1 by arrows 30,31,32,33,34 and 35. In the example described, circuit C controls clutch take-up from rest and clutch disengagements and re-engagements on coming to rest and during gear changes to provide, for example, a semi-automatic transmission of the type described in the Applicant's previously referred to European patents and application.

It will be appreciated, however, that the vehicle could employ a fully automatic transmission arrangement in which not only is coutch take-up, engagement and disengagement controlled but also the actual changing of the gear ratios. Alternatively the invention could also be applied to a vehicle in which the clutch is operated fully manually and the circuit C controls some other function of the vehicle such as the vehicle suspension in a vehicle fitted with active or self-levelling suspension.

Whilst three circuits are shown, the principle can equally be applied to more circuits.

When utilising the present invention on the above described semi-automatic type of transmission arrows 30,31,32 and 33 are used to sense engine speed, road speed, transmission gear currently selected and clutch engagement position respectively. Arrows 34 and 35 indicate the sensing of steering angle and brake pressure or brake application. Thus the electrical control means 28 receives signals indicative of the operating state of each circuit A,B and C and of the fluid pressure supply status of each circuit from pressure sensors 25 to 27.

FIGS. 2 to 5 show diagrammatically the spool positions of valve 15 to distribute pump flow to the circuits A,B and C. The spool position is controlled using known pulse width modulation techniques under which the solenoid 15 is pulsed via lines 29 from control unit 28. As can be seen in FIGS. 2 to 5 the spool 36 of valve 15 is displaced by solenoid 15a against the action of return spring 37 to produce the desired spool displacement and consequent flow distribution. As will be appreciated, to produce a greater valve spool displacement a higher mean solenoid current is required this is achieved when using a fixed frequency pulse width modulation by increasing the duty cycle of the modulation.

Figure 2:
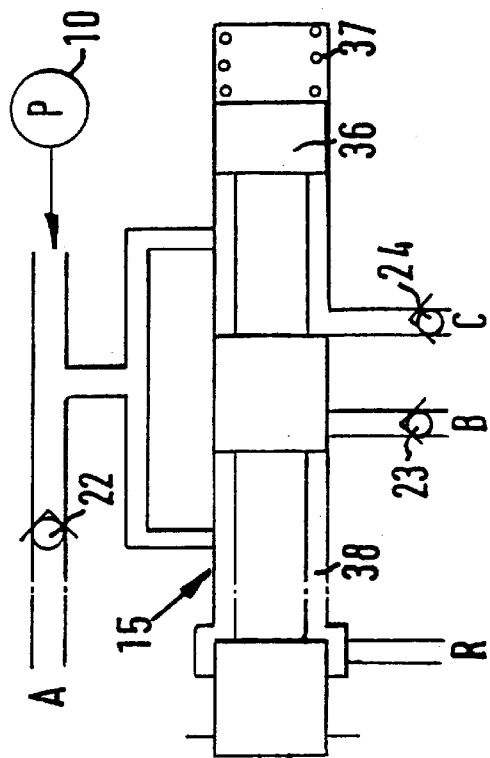
Figure 2:
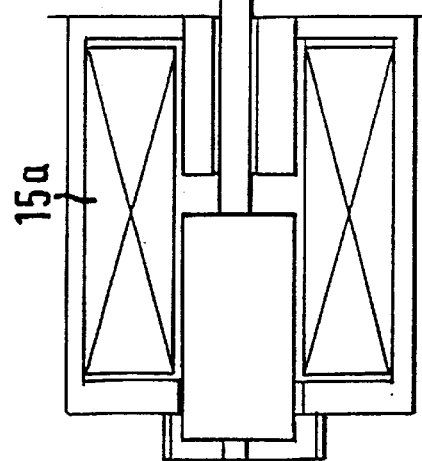

Referring to FIG. 2 this shows the spool 36 in the solenod "off" condition in which pump 10 is connected with return R via annular spool chamber 38 and the circuits A, B and C are islolated from the pump 10 via their respective non-return valves 22,23 and 24. This is the so-called "off load" position in which there is relatively little load on the pump 10. The control system 28 is arranged to adopt this condition automatically on start up of the system to avoid high power losses particularly in low temperature conditions whiere the requirement to pump cold viscous fluid into circuits A,B and C would otherwise cuase significant pump start up load. The FIG. 2 position is also assumed when all the circuits are fully charged to again minimise pump load on restart.

Figure 3:
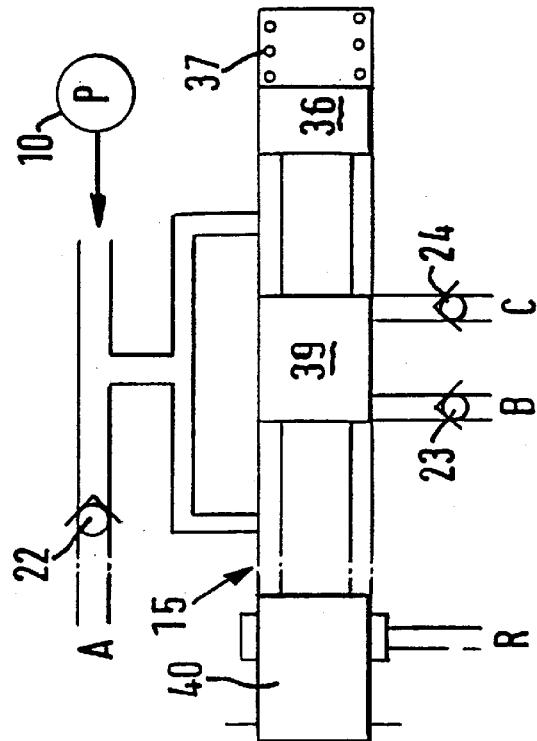
Figure 3:
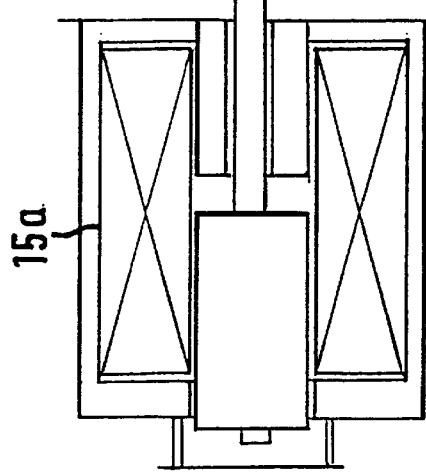

In FIG. 3 spool 36 is displaced to the right from the FIG. 2 position so that central spool land 39 cuts-off the flow to circuits B and C and end land 40 cuts-off flow to return line R. In this condition all pump flow is directed to hydraulic circuit A which, in the example described, is the steering circuit which has number one priority.

Figure 4:
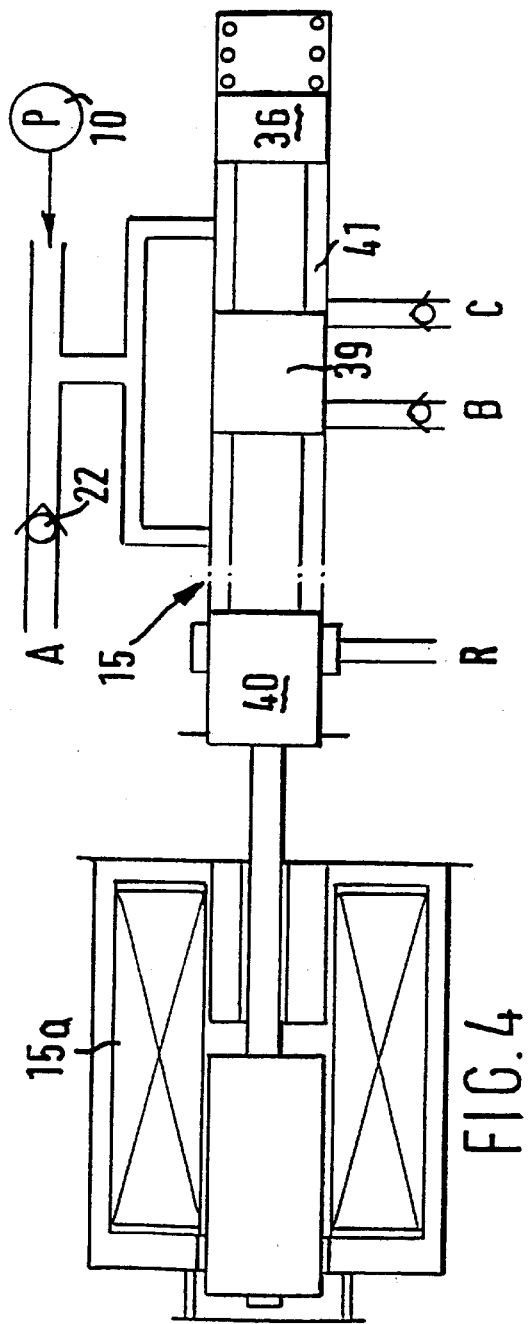

In the FIG. 4 condition end land 40 continues to close-off return line R whilst central land 39 closes off circuit B but allows communication to circuit C via spool chamber 41. Thus in the FIG. 4 condition A and C are provided with flow from pump 10.

Figure 5:
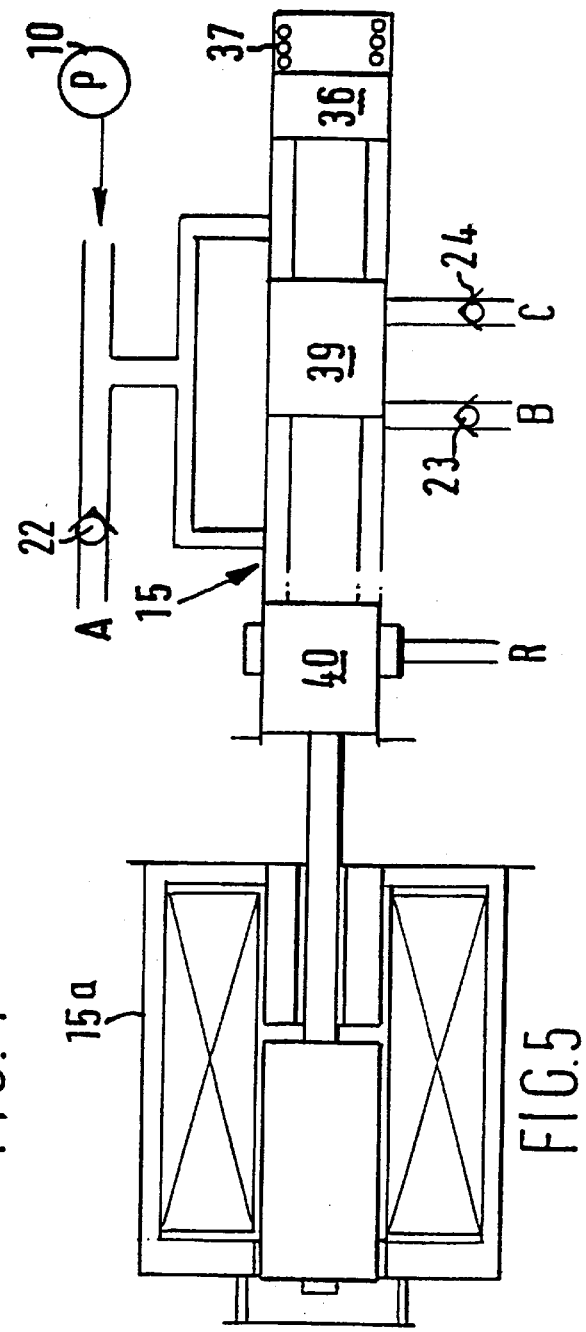

In the FIG. 5 condition end land 40 closes-off return line R and central land 39 closes-off circuit C so that circuits A and B both receive flow from pump 10.

Control unit 28 has stored in internal memory a record of the minimum pressure level required to operate the function associated with each circuit A,B and C (eg. steering, brakes and clutch) and also the maximum pressure level at which each circuit is considered to be fully charged. The fluid pressure supply sytem is arranged to ensure that each circuit is maintained at least at its minimum pressure level to ensure that it can continue to operate its associated function fully. Control system 28 also has stored in its memory the assigned priority of the three circuits A,B and C which may be variable depending on the current use condition of each circuit.

As indicated above the control system 28 receives inputs 30 to 35 indicative of the operative state of the functions controlled by each hydraulic circuit A,B and C. Thus, for example, inputs 30 to 33 indicate the state of operation of the clutch control system 21 whereas input 34 indicates the state of operation of the steering system (ie. whether it is on full lock and therefore in a high load condition or in the straight ahead low load position) and sensor 35 indicates whether the brakes are being applied either by indicating brake pressure or movement of the brake pedal using a proximity switch.

Thus using the inputs 30 to 35 the system allocates the available flow from pump 10 to each circuit A,B and C in accordance with its current demand. For example, if the vehicle is being turned in the road when all three circuits A,B and C are potentially in operation the control unit 28 will supply fluid to each circuit when that circuit actually requires flow and will supply sufficient fluid to each circuit to maintain the minimum pressure required to operate the associated function.

If the total system demand from all the circuits reaches a predetermined emergency level at which the pump is in danger of not being able to maintain the minimum pressure in each circuit the system may be arranged to activate a warning device such as a buzzer and/or a warning light. In this condition a predetermined emergency priority of circuit supply may be allocated by the system which may be dependent on the actual current operative state of the circuits.

Thus with such control over the distribution of pump output it is possible to ensure the continued operation of all three circuits A,B and C using a pump 10 whose delivery capacity is insufficient to be capable of charging all three circuits simultaneously to their predetermined maximum pressure levels. This enables a smaller and thus more economical pump to be utilised.

The system is designed to raise each circuit A,B and C to its maximum pressure level by gradually feeding fluid to each circuit in turn as appropriate for the current operating condition of the vehicle so that the pressure level in each circuit gradually builds up to the predetermined maximum. When the maximum pressure condition is achieved in all circuits the valve spool is placed in the FIG. 2 position to return the pump delivery via line R to the reservoir 14 and electric motor 11 is turned off by relay 13 to save current flow and thus power consumption. As described above, FIGS. 3,4 and 5 show the other circuit supply conditions which are commanded by the control system 28 as appropriate to maintain the minimum circuit pressure and gradually build-up each circuit pressure level.

The control philosophy of unit 28 could include a "pump connect time concept" based on the assumption that if the full output of the pump is directed to any given circuit it would be capable of fully charging that circuit in 4 seconds so that the intermittent circuit top-ups carried out by valve 15 could be limited to 1 second connections of the pump to each respective circuit if the pump is trying to satisfy demand from all three circuits.

It will also be appreciated that although a linear solenoid-operated control valve 15 has been described above the system could equally well use a rotary solenoid operated valve with ports disposed radially around the valve.

I claim:

1. A vehicle fluid pressure supply system characterised by comprising a fluid pressure supply pump connected via solenoid-operated flow control valve means with a plurality of separate fluid pressure operated circuits each operating separate functions of the vehicle, means for detecting the current operative state and the fluid pressure supply status of each circuit, and electrical control means which receives signals from the detecting means and operates the control valve means to direct available pump flow to the appropriate circuit to maintain each circuit at least at a minimum pressure level required to operate the associated function.

2. A supply system according to claim 1 characterised in that the electrical control means also receives inputs indicative of an operating parameter of an associated vehicle.

3. A supply system according to claim 1 characterised in that the fluid pressure level in each circuit is maintained between said minimum pressure level and a predetermined maximum pressure level indicative of a fully charged condition.

4. A supply system according to claim 3 characterised in that the pump is driven by an electric motor and is switched off to save current and power when the circuits are fully charged.

5. A supply system according to claims 1 characterised in that the electrical control means also distributes fluid to the circuits in accordance with a memorised assigned circuit priority which may be variable depending on the current operative state of each circuit.

6. A supply system according to claims 1 characterised in that if total system demand reaches a predetermined emergency level at which the pump is in danger of not being able to maintain the minimum pressure in each circuit a warning device is activated.

7. A supply system according to claim 6 characterised in that when the predetermined emergency demand level is reached and emergency circuit supply priority is allocated which may be dependent on the current operative state of each circuit.

8. A supply system according to claims 1 characterised in that flow to the circuits is allocated on a "pump connect time" concept where in periods of high demand each given circuit requiring fluid replenishment are connected to the pump for a predetermined proportion of the time required by the pump to fully charge the given circuit.

9. A supply system according to claims 1 characterised in that the control valve means comprises a linear solenoid-operated control valve.

10. A supply system according to claims 1 characterised in that the control valve means comprises a rotary solenoid-operated control valve with ports disposed radially around the valves.

* * * * *